Jan. 9, 1968 R. C. CASE 3,362,177
VAPOR PRESSURE CONTROL IN LIQUEFIED GAS DISPENSING
Original Filed Jan. 16, 1964

INVENTOR.
R. C. CASE

United States Patent Office 3,362,177
Patented Jan. 9, 1968

3,362,177
VAPOR PRESSURE CONTROL IN LIQUEFIED
GAS DISPENSING
Robert C. Case, Bartlesville, Okla., assignor to Phillips
Petroleum Company, a corporation of Delaware
Original application Jan. 16, 1964, Ser. No. 338,164, now
Patent No. 3,276,467, dated Oct. 4, 1966. Divided and
this application June 30, 1966, Ser. No. 561,965
4 Claims. (Cl. 62—55)

ABSTRACT OF THE DISCLOSURE

Vapor pressure control in liquefied gas dispensing is effected by maintaining a vapor pressure on a diaphragm in a pilot valve overiding a backpressure regulator valve in a high pressure liquefied gas line equal to the vapor pressure in said line by means of an upright conduit connected with a heat-sensitive well in said line and with a chamber in said pilot valve containing said diaphragm, said conduit containing liquefied gas corresponding to that in said line. The vapor-pressure-senstive conduit is loaded from the high pressure line by connecting a lower section of said conduit by loading conduit means with said line, first purging said vapor line with vapor from said conduit means, thereafter closing the end of said vapor conduit remote from said line, and flowing liquid from said line thru said loading conduit means into the lower end of said vapor conduit.

---

Figure 1:
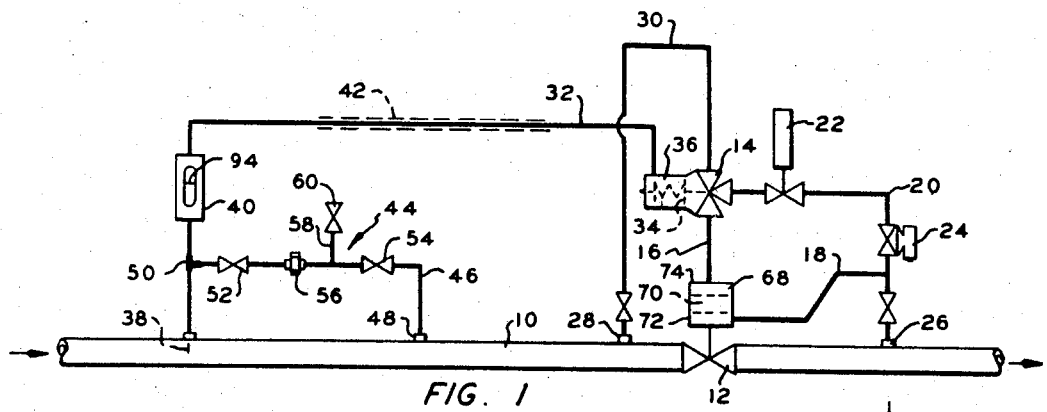

This application is a division of applicaton S.N. 338,164, filed Jan. 16, 1964, now U.S. Patent 3,276,467.

This invention relates to a method and apparatus for controlling backpressure on a liquefied gas stream.

In dispensing liquefied gas such as liquefied petroleum gas (LPG), a backpressure regulator valve is utilized on the fluid delivery line at a conventional truck-loading dock. The pressure in the delivery line is regulated at a value near the vapor pressure of the LPG at ambient temperature and not at a much higher pressure in order to permit operation of the pump upstream of the backpressure regulator with as little energy as possible. The backpressure varies with atmospheric temperature.

A problem involved in delivering or dispensing LPG and similar liquefied gases to tank trucks and similar receiving vessels is in the maintenance of the backpressure in the delivery line just above the vapor pressure of the liquid at ambient atmospheric temperature. This invention is concerned with a method and apparatus for maintaining backpressure in such a delivery system just above the vapor pressure of the liquid at ambient temperature.

Accordingly, it is an object of the invention to provide an improved backpressure regulator for use on a liquefied gas delivery line. Another object is to provide a vapor pressure control system on a backpressure regulator valve. A further object is to provide a loading means and system for the vapor pressure control system of the invention. Other objects of the invention will become apparent to one skilled in the art upon consideration of the accompanying disclosure.

A board aspect of the invention comprines an improvement in a backpressure regulator valve having a pilot regulator wherein the pilot regulator is provided with an inlet for vapor to be admitted from a source having a vapor pressure substantially that of the vapor pressure of the liquefied stream in the line in which the regulator valve is positioned. The vapor inlet of the pilot regulator is connected by conduit means with a thermowell in the line upstream of the regulator valve and the conduit means is provided with a mass of liquid adjacent the thermowell so that the vapor pressure on the confined mass of liquid is the same as the vapor pressure of the liquid in the line at ambient temperature.

Another aspect of the invention comprises a means and method of loading the vapor system connected with the pilot regulator wherein fluid from the delivery line is passed into the vapor pressure conduit near the thermowell and the vapor thereof is discharged through the vapor conduit so as to purge the same of air while the end adjacent the pilot regulator is disconnected. The end is then connected to the pilot regulator and liquid is passed from the delivery line into the vapor conduit until the desired mass of liquid is loaded therein. The most convenient method is to provide a sight glass in an upright section of the vapor conduit adjacent the thermowell and allow liquefied gas to flow into the conduit below the sight glass until the level of liquid appears at an intermediate section of the sight glass. The flow of liquid is then cut off and the conduit is sealed so as to provide a temperature-sensitive vapor pressure in the vapor conduit.

Figure 3:
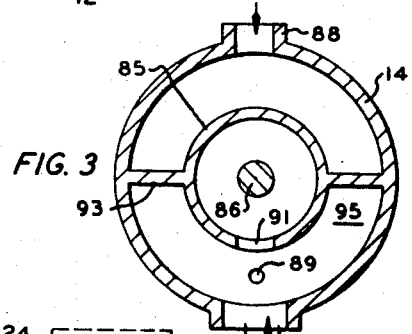
Figure 2:
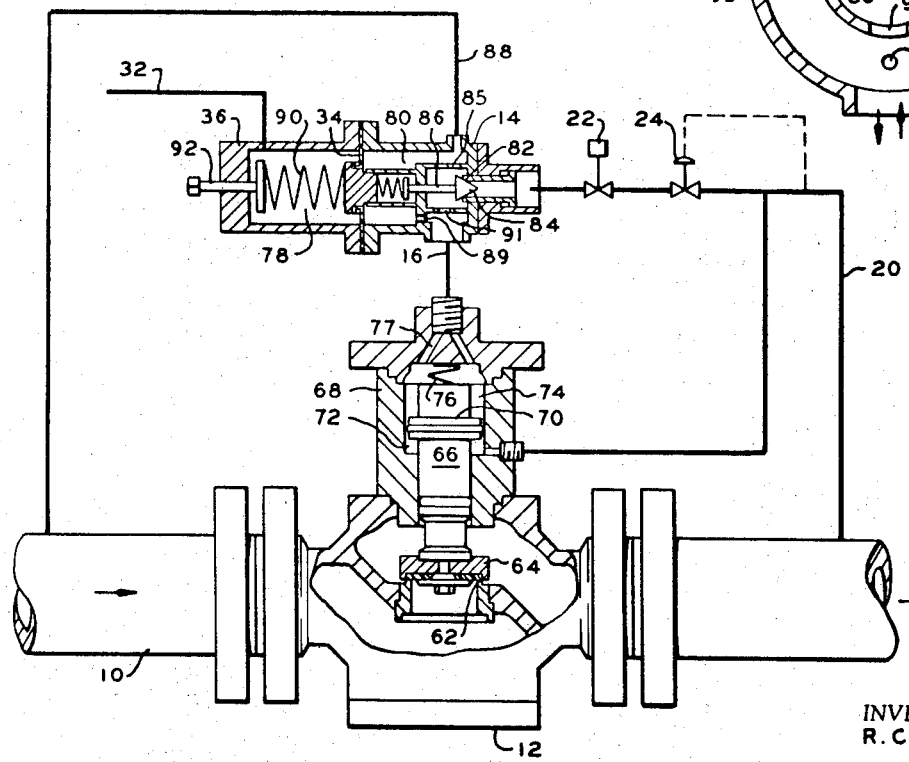

A more complete understanding of the invention may be had by reference to the accompanying schematic drawing of which FIGURE 1 is a view showing a preferred arrangement of apparatus for effecting the invention; FIGURE 2 is a view in partial section of the backpressure regulator valve of FIGURE 1, in more detail; and FIGURE 3 is a transverse section through the valve housing of the pilot regulator of FIGURE 2.

Referring to the drawing, and particularly FIGURE 1, a high pressure LPG delivery line 10 is provided with a backpressure regulator valve 12 to which a pilot regulator 14 is operatively connected through conduit 16 and through conduits 18 and 20. A conventional solenoid shutdown valve 22 is positioned in conduit 20 along with a backpressure regulator 24. Conduit 20 is tapped into line 10 at 26 downstream of valve 12. A port in pilot regulator 14 is connected with a tap 28 upstream of valve 12 by means of conduit 30.

Vapor conduit 32 connects a vapor compartment in pilot regulator 14 formed by diaphragm 34 and housing 36 of valve 14 with a thermowell 38 in line 10 upstream of valve 12. A sight glass 40 is positioned in an upright section of conduit 32 adjacent thermowell 38. Heavy insulating material 42 shown on a portion of line 32 covers the entire vapor conduit system including sight glass 40 except the glass itself. This insulation is essential to accurate operation of the device.

Loading means 44 comprises a line 46 connecting line 10 at tap 48 with a T in line 32 intermediate sight glass 40 and thermowell 38. Cutoff valves 52 and 54 are positioned in conduit 46 and union 56 and bleed-off line 58 having valve 60 therein connects with line 46 intermediate valves 52 and 54.

Referring to FIGURE 2, valve 12 comprises a seat 62, a valve head 64 movable vertically onto and off the seat by valve stem 66 extending into a cylinder 68 attached to the valve body. A piston 70 is attached to valve stem 66 and divides the interior of cylinder 68 into two compartments designated 72 and 74. Piston 70 and valve stem 66 are biased toward seat 62 by spring 76. Passageway 77 in the top closure of the main valve 12 provides communication between compartment 74 and conduit 16.

Pilot regulator 14 is provided with a diaphragm 34 dividing the interior thereof into a vapor compartment 78 and a valve compartment 80. A valve seat or exhaust port 82 and a valve head 84 with a valve stem 86 connect with diaphragm 34 to form the valve mechanism within compartment 80. A port on the side of valve compartment 80 is connected with compartment 74 of the main valve by conduit 16. Conduit 20 connects with the exhaust port 82 and conduit 88 connects a second port in the side of compartment 80 with line 10 upstream of valve 12. Vapor conduit system 32 connects with an inlet port in the side of housing 36 enclosing compartment 78. A compression spring 90 with adjustable element 92 applies pressure to diaphragm 34 as illustrated in FIGURE 1. The outlet of compartment 80 into conduit 16 is through a small orifice 89. This limits the flow rate of liquid into conduit 16 from conduit 88 and compartment 80 during operation of the valve.

Referring to FIGURE 3, a horizontal partition 93 on each side of inner valve housing 85 divides annular passageway around housing 85 into an upper compartment freely communicating with compartment 80 and a lower compartment separated from compartment 80 by a partition 95 in which orifice 89 is positioned as the only passageway between compartment 80 and conduit 16. Passageway 91 in housing 85 is substantially larger than orifice 89 so that flow from line 16 through valve 82 is faster than flow from line 88 through compartment 80 and orifice 89.

To provide the desired vapor pressure in vapor conduit 32, the same must be properly loaded with liquefied gas from line 10. The procedure for loading vapor conduit 32 comprises disconnecting this conduit from housing 36, and while valve 60 is closed opening valves 52 and 54 slightly so as to bleed liquid from line 10 into conduit 32 at 50. The liquid vaporizes in conduit 32 and purges same of air or other gas therein. The open end of conduit 32 is then connected with housing 36 in sealed relation therewith and valves 52 and 54 are further opened, having been closed while connecting conduit 32 to housing 36, and liquefied gas is admitted to conduit 32 until the level thereof is visible at an intermediate section of sight glass 42 as designated 94. Valves 52 and 54 are then closed and valve 60 is opened to bleed off the pressure in line 46 intermediate valves 52 and 54. This completes the loading and the system 44 may then be dismantled by uncoupling 56 and plugging valves 52 and 54 to seal off the system. If, however, it is desired to utilize line 10 for transporting a different gas at any time, the loading system may be left intact.

The system illustrated in the drawing was constructed on an LPG truck loading dock utilizing a Fisher 404–93–630 pressure regulator arrangement. The usual vent in housing 36 of the pilot regulator was sealed shut and the housing was tapped for a small conduit connection for vapor conduit 32. The other structure of the regulator assembly was the same as commercially available.

The vapor conduit system was fabricated utilizing a standard thermowell tapped into line 10 and coupled to a Jerguson 18–R–5 gauge glass with ¼" steel tubing and a T joint 50 for connecting line 56 thereto. The conduit connecting the upper end of a sight glass 40 with shell 36 of the pilot regulator was ⅛" tubing. All of line 32 exclusive of the glass in the sight was heavily insulated to prevent heat transfer to and from the system, except from the thermowell.

The loading system 44 was fabricated of ½" pipe and fittings, substantially as shown in FIGURE 1.

The apparatus described and constructed in accordance with the invention has operated to maintain a backpressure on the high pressure LPG line of a truck-loading dock about 15 pounds above the pressure in the delivery line downstream of the backpressure valve or the delivery pressure to the tank on the truck. The tank filling pressure of delivery pressure was maintained at about 200 p.s.i. on the average, while the upstream pressure was maintained at about 215 p.s.i. average pressure which was about 50 p.s.i. over vapor pressure. This represents a 15 p.s.i. pressure drop through the backpressure valve.

Valve 12 operates to control the pressure in line 10 upstream of the valve just above the vapor pressure of the LPG at the temperature of the liquid in the product line. Spring 90 provides the desired margin above vapor pressure so as to assure maintaining the LPG in the line in liquid phase. The desired margin provided by spring 90 is variable by adjusting element 92 which threads into the end of shell 36 and seals therewith.

The vapor pressure in vapor system 32 represents the true vapor pressure of the liquid LPG in line 10 and this pressure, which varies with temperature of product in line 10, is applied to the diaphragm 34 of pilot regulator 14. When the upstream pressure is below the vapor pressure in vapor system 32 pulls the pressure applied by pilot spring 90, full upstream pressure is introduced to the top of piston 70 through line 88 and through a fixed orifice 89, conduit 16, and compartment 74. Exhaust port 82 is closed by valve head 84. When the upstream pressure increases above the relief pressure setting, it acts on diaphragm 34 so as to open exhaust port 82 by moving valve head 84 off its seat. This bleeds pressure out of chamber 74 above piston 70 faster than it can enter through the fixed orifice 89, causing piston 70 to move upward and open port 62. The excess pressure now passes downstream. When the excess upstream pressure drops, pressure against diaphragm 34 on the valve compartment side thereof is decreased, allowing the set pressure of pilot spring 90 and the vapor pressure of the LPG in vapor system 32 to close port 82. This upstream pressure now loads the top of piston 70, closing valve port 62. Since the piston area is greater than the port area 62, the upstream pressure causes the main valve to close. This difference in area between the piston 70 and port 62 also insures tight shutoff of the regulator.

Solenoid 22 is conventional equipment utilized for effecting shutdown of the control. Device 24 is a Fisher 630 regulator set at 240 p.s.i.g. and operates as a backpressure regulator on line 20. These instruments are independent of the invention and their operation needs no further discussion.

Thus it can be seen that, when properly insulated, the vapor control system reads the temperature of the liquefied gas stream and exerts the pressure of equilibrium of the gas for that temperature and the spring in the pilot valve adjusts for the margin of pressure above the vapor pressure desired to maintain liquid phase conditions in the delivery line. This is a simple and efficient system and method of applying a variable control on the backpressure valve which maintains the backpressure in the liquid delivery line at a predetermined value above the vapor pressure of the liquid under varying temperature conditions.

Certain modifications of the invention will become apparent to those skilled in the art and the illustrative details disclosed are not to be construed as imposing unnecessary limitations on the invention.

I claim:

1. In combination with a high pressure line carrying a liquefied gas:
    (1) a temperature-sensitive well in said line for transmitting heat between the liquid in said line and the liquid in (3) below;
    (2) an insulated conduit having an upright section connected directly with said well, the end of said conduit opposite said well leading to a vapor pressure sensitive means; and
    (3) a mass of said liquid in the upright section of (2), the remainder of said conduit being filled with vapor of said liquid at the vapor pressure of said liquid at the temperature in said line.

2. The combination of claim 1 including:
    (4) a sight glass in the upright section of (2).

3. In combination with the apparatus of claim 2,
    (5) a loading conduit connecting said line with the the upright section of (2) below the sight glass of (4) having a pair of spaced apart cutoff valves therein and a valved bleed-off pipe connecting therewith intermediate the valves of said pair.

4. A method of loading a vapor-pressure-sensitive system comprising a temperature-sensitive well attached to a line carrying a liquefied gas, a vapor conduit having an upright section attached to said well, and a sight glass in said upright section, which comprises:
   (1) connecting said upright section below said sight glass with said line by a loading conduit having valve means therein for controlling liquid flow therethru;
   (2) opening the end of said vapor conduit remote from said well;
   (3) bleeding fluid from said line thru the loading conduit of step (1) to purge said vapor conduit of gas present therein;
   (4) closing the conduit end opened in step (2);
   (5) allowing liquid to flow from said line thru the loading conduit of (1) until liquid is at a visible level in said sight glass; and
   (6) thereafter, closing the loading line to flow therethru.

References Cited
UNITED STATES PATENTS

| | | | |
|---|---|---|---|
| 2,958,205 | 11/1960 | McConkey | 62—55 X |
| 2,976,695 | 3/1961 | Meade | 62—55 X |
| 2,993,344 | 7/1961 | Reed | 62—55 X |
| 3,247,713 | 4/1966 | Reed | 62—49 X |
| 3,266,261 | 8/1966 | Anderson | 62—55 X |

LLOYD L. KING, *Primary Examiner.*